United States Patent Office 3,689,441
Patented Sept. 5, 1972

3,689,441
COATING COMPOSITIONS FOR ARRESTING THE SURFACE LUBRICITY OF POLYOLEFIN SHAPED ARTICLES
Yasuaki Hori, Yokohama, and Kazuo Yoneda and Takahiko Kobayashi, Fujisawa-shi, Japan, assignors to Showa Denko Kabushiki Kaisha, Tokyo, Japan
No Drawing. Filed Sept. 9, 1968, Ser. No. 758,626
Claims priority, application Japan, Sept. 19, 1967, 42/59,775
Int. Cl. C08c 11/70
U.S. Cl. 260—5
10 Claims

ABSTRACT OF THE DISCLOSURE

Coating compositions for arresting the surface lubricity of polyolefin shaped articles, which are composed of a homogeneous mixture of a finely divided inorganic solid substance, a polymer containing no chlorine in the molecule, a low-molecular-weight polyethylene, a chlorine-containing polymer and an organic solvent.

---

This invention relates to a coating composition for arresting the surface lubricity of shaped articles of polyolefins.

The shaped articles made from the polyolefins, typically polyethylene and polypropylene, usually have a smooth surface. While this is their feature, on the other hand, this property becomes a disadvantage depending upon the use to which they are to be put and accordingly imposes a limitation on the type of use for which they can be suitably applied. For example, the polyolefin film or sheet, or the cloth obtained by weaving or knitting a filament or tape of polyolefin are used as packaging materials, e.g. sacks for packaging of fertilizers, grains, raw wool and various other products. However, the polyolefins possess great surface smoothness, and accordingly the sacks made therefrom are also very smooth and lubricious. Now, when goods packaged with these sacks are to be stacked in storing or transporting them, either their stacking becomes impossible or great inconvenience is experienced in their handling.

For avoiding this type of difficulty, application to the surface of sacks made of polyolefins of a paint which imparts frictional resistance has been tried heretofore. In this case, due to the fact that the polyolefins are nonpolar, the paint easily peels off on account of unsatisfactory adhesion. Therefore, it actually becomes of no use after the repetition of the stacking or restacking and hauling a few times. This shortcoming is not limited to the sacks used for packaging but also holds true in the case of the other shaped articles of polyolefins. For improving the adhesion of the paint, the application of the paint after having caused the formation of polar groups on the surface of the shaped articles by subjecting the surface in advance to a treatment by means of such as an electric discharge, flame or acid is also being practiced. However, the method described requires the troublesome pretreating operations such as indicated and thus not only becomes costly but also is attended with the difficulty that the application of the paint must be carried out immediately after the completion of the pretreatment. In addition, a proposal which intends to obtain the non-slip effect by applying a sticky adhesive to the surface of the polyolefin shaped articles is also known but, needless to say, in the case the adhesive-applied surface would be sticky and hence is not desirable.

The object of the present invention is to provide a coating composition for polyolefin shaped articles which, by being directly applied to the surface of polyolefin articles without the necessity of any pretreatments whatsoever, adheres firmly to the surface to demonstrate a satisfactory non-sticky, surface lubricity arresting action.

The coating composition for arresting the surface lubricity of polyolefin shaped articles of the present invention comprises a homogeneous mixture containing
 (a) At least one water-insoluble finely divided inorganic solid substance,
 (b) At least one polymer containing no chlorine in the molecule selected from limed resin, coumarone-indene resin and elastomeric polymers,
 (c) A polyethylene of a molecular weight of 1,000–10,000,
 (d) At least one chlorine-containing polymer selected from polychloroprene, chlorinated rubber, vinylchloride-vinylacetate copolymer, chlorinated polyethylene and chlorinated polypropylene, and
 (e) At least one solvent capable of dissolving ingredients (b), (c) and (d); wherein the amount of ingredients (b)+(c) is 15–200% by weight based on ingredient (a), the amounts of ingredient (b) and ingredient (c) each being 0–200%; the amount of ingredient (d) is 20–150% by weight based on the amount of ingredients (b)+(c); and the amount of ingredient (e) is an amount sufficient to dissolve ingredients (b), (c) and (d).

When the hereinabove described invention coating composition is applied to the surface of a polyolefin shaped article and thereafter ingredient (e), the organic solvent, is volatilized, a coating firmly adhering to the surface is formed, which has an excellent lubricity arresting action. The ingredient (e) of the foregoing composition serves to facilitate the coating operation by its action of homogenization dilution of the toal composition, whereas the other ingredients are the indispensable coat-forming ingredients which are to be retained on the surface of the shaped article. Of the ingredients (b) and (c), only one need be contained, but it is preferred that both are contained. The intended object of the present invention cannot be attained where the aforementioned indispensable ingredients other than (e) are used alone or in a combination of only two. It goes without saying that ingredient (a), the inorganic substance, will not adhere to the surface of the polyolefin substrate, when used alone. Further, even though this inorganic substance is mixed with the ingredients (b) and/or (c), which are synthetic resins not containing chlorine, these mixtures do not adhere to the polyolefin substrate, though the particles of the inorganic substance firmly adhere to each other. On the other hand, the adhesion between the particles of the inorganic substance does not take place by just mixing the chlorine-containing synthetic resin with the inorganic substance, and accordingly these particles cannot be held firmly to the surface of polyolefins.

However, when the aforementioned indispensable ingredients (a), (b) and/or (c), and (d) are copresent, the intended object and effects of the present invention are marvelously achieved. This is presumed to be due to the synergistic effect of these ingredients. The most important functions that are believed to be demonstrated by these ingredients are believed, in all probability, to be as follows: The inorganic substance (a) is believed to perform the principal action of arresting the lubricity, while the synthetic resin not containing chlorine (a) and/or (c) is believed to provide the adhesive action between the particles of the inorganic substance. On the other hand, the chlorine-containing resin (d) is believed to become dispersed finely in the resin not containing chlorine to activate the latter and, as a result, performs the action of strengthening the adhesion between the resin not containing chlorine and the surface of the polyolefin shaped article. Further, the reason that the coating formed by the invention composition does not exhibit stickiness is believed to be due to the effect of ingredient (a) assisted by ingredient (c).

The water-insoluble inorganic substance, ingredient (a), of the invention composition is not limited as to its class, and included are, for example, kaolin, clay, bentonite, satin white, titanium white, zinc oxide, magnesium oxide, magnesium sulfate, barium sulfate, calcium carbonate, iron oxides and the other inorganic substances having a large coefficient of friction. These inorganic substances are preferably finely divided so that the average diameter of individual particles is less than 50 microns. When the particles are larger than this, they tend to settle in the composition and adverse effects are had on their handling as well as workability. For example, when the composition is to be applied using a gravure roll coater, clogging of the coater is apt to occur.

As the elastomeric polymer containing no chlorine in the molecule, the ingredient (b), mention can be made of such, for example, as polyvinyl acetate, polybutadiene, styrene-butadiene copolymer, ethylene-vinyl acetate copolymer, butadiene-acrylonitrile copolymer, isoprene-isobutylene copolymer, ethylene-propylene copolymer, polyisobutylene, atactic polypropylene and cyclized rubber. Aside from these elastomeric polymers, the coumarone-indene resin and limed resin (calcium modified rosin) are also effectively utilized as ingredient (b). All of these polymers can be used alone, but good results are usually had by using a plurality of these polymers in combination.

Ingredient (c) is a polyethylene of a molecular weight ranging between 1,000 and 10,000, that in the range 1,500–5,000 being especially preferred.

The chlorine-containing polymer, the ingredient (d), is chosen from among those previously indicated. This polymer can be used singly or in combinations of two or more.

The organic solvent, ingredient (e), is that which is capable of dissolving the ingredients (b), (c) and (d). Conveniently used solvents are, for example, such as toluene, xylene, benzene, acetone, methyl ethyl ketone, ethyl acetate, butyl acetate, ethyl alcohol, tetrahydrofuran and dimthylformamide.

If desired, the invention composition can contain such coloring matter as dyestuffs and pigments in addition to the hereinbefore indicated ingredients.

When the hereinabove indicated several ingredients are mixed in accordance with the previously indicated ratios and formed into a homogeneous mixture, the coating composition of the present invention is obtained. The form of the homogeneous mixture may be one in which the finely divided particles of the inorganic substance and uniformly dispersed and the remaining polymer ingredients are in solution or emulsion. The mixing of all the ingredients can be carried out by any of the customary procedures. However, especially convenient is the use of mixing rolls.

The composition obtained in the foregoing manner is then applied to the surface of polyolefin shaped articles by use of a brush or roll coater, or by spraying or other suitable methods. In applying the composition to films, sheets, cloth and the like, preferably used is, for example, a kiss roll coater, a gravure roll coater or a reverse roll coater, following which application the drying of the coating can also be carried out at the same time. The composition is applied usually at such a rate that the amount becomes 3–10 grams of total solids per square meter of the surface coated. The application of the composition need not necessarily be to the total surface of the shaped article. For example, in the case of a shaped article for packaging use of small size, the non-slip effect can be demonstrated by the formation of the coating only locally in the form of characters or patterns. That is to say, a composition containing coloring matter can be used and made to serve both for printing of the characters and patterns and for accomplishing the lubricity arresting function.

The following examples and comparisons are given for further illustration of the effects of the invention composition. Unless otherwise indicated, the parts and percentages are on a weight basis.

EXAMPLE 1

Preparation of the composition

Compositions in accordance with the present invention were made by compounding the mixtures having the following recipes (1), (2) and (3) on mixing rolls. By way of comparison, the comparison compositions of a mixture according to recipe (A) in which the chlorine-containing resin ingredient was lacking and of a mixture according to recipe (B) in which the resin ingredient not containing chlorine was lacking were also made in similar manner by compounding on mixing rolls. The solids content in all instances was 40%. The polyethylene ingredient used had a molecular weight of about 1500.

| Invention recipe (1): | Part |
|---|---|
| Clay | 5 |
| Calcium carbonate | 10 |
| Low-molecular-weight polyethylene | 10 |
| Limed resin | 5 |
| Vinyl acetate-vinyl chloride copolymer | 5 |
| Toluene | 36.8 |
| Ethyl acetate | 15.7 |
| Total | 87.5 |

| Invention recipe (2): | Part |
|---|---|
| Magnesium sulfate | 1 |
| Calcium carbonate | 9 |
| Polyisobutylene | 2 |
| Low-molecular-weight polyethylene | 12 |
| Polychloroprene | 2 |
| Chlorinated polypropylene | 2 |
| Toluene | 33.6 |
| Methyl ethyl ketone | 8.4 |
| Total | 70.0 |

| Invention recipe (3): | Part |
|---|---|
| Calcium carbonate | 10 |
| Limed resin | 5 |
| Low-molecular-weight polyethylene | 5 |
| Chlorinated rubber | 5 |
| Toluene | 37.5 |
| Total | 62.5 |

| Comparison recipe (A): | Part |
|---|---|
| Clay | 5 |
| Calcium carbonate | 10 |
| Limed resin | 5 |
| Low-molecular-weight polyethylene | 15 |
| Toluene | 36.8 |
| Ethyl acetate | 15.7 |
| Total | 87.5 |

| Comparison recipe (B): | Part |
|---|---|
| Magnesium sulfate | 1 |
| Calcium carbonate | 9 |
| Polychloroprene | 10 |
| Vinyl acetate-vinyl chloride copolymer | 8 |
| Toluene | 33.6 |
| Methyl ethyl ketone | 8.4 |
| Total | 70.0 |

Non-slip and adhesive effects

Each of the foregoing compositions was applied to a polyethylene woven fabric (2000 denier, 14 x 14 mesh) using a gravure roll coater. The abrasion resistance and coefficient of friction of these specimens were measured, with the results shown in Table I.

TABLE I

| Composition | Abrasion resistance [1] | Coefficient of friction [2] |
|---|---|---|
| Invention recipe: | | |
| (1) | 139 | 0.62 |
| (2) | 140 | 0.61 |
| (3) | 148 | 0.61 |
| Comparison recipe: | | |
| (A) | 63 | 0.47 |
| (B) | 78 | 0.51 |

[1] In accordance with Japan Industrial Standard P-8136 (Testing Method of Abrasion Resistance of Paper Board), the numerical values being the number of times of rubbing required for completely removing the coating.
[2] An inclined plate type coefficient of friction tester was used and the coefficient of friction ($\mu = \tan \theta$) between two surfaces which had received the non-slip treatment was measured.

By way of comparison, the same polyethylene woven fabric which had not been given any treatment at all had a coefficient of friction of 0.33 and was very lubricious.

EXAMPLE 2

Preparation of composition

Compositions in accordance with the present invention having the following recipes (4), (5) and (6) were prepared.

Recipe (4):                                                  Part
  Calcium carbonate _____ 15
  Polyisobutylene (molecular weight 50,000) ____ 10
  Low-molecular-weight polyethylene (molecular
    weight 5,000) _____ 3
  Polychloroprene _____ 12
  Vinylchloride-vinyl acetate copolymer _____ 5
  Toluene _____ 35
  Ethyl acetate _____ 15
      Total _____ 95

Recipe (5):                                                  Part
  Clay _____ 5
  Calcium carbonate _____ 5
  Polyisobutylene (molecular weight 50,000) ____ 17
  Chlorinated rubber _____ 12
  Polychloroprene _____ 10
  Toluene _____ 51
      Total _____ 100

Recipe (6):                                                  Part
  Clay _____ 16
  Atactic polypropylene _____ 10
  Low-molecular-weight polyethylene _____ 1
  Vinylchloride-vinyl acetate copolymer _____ 5
  Toluene _____ 30
  Ethyl acetate _____ 13.5
      Total _____ 75.5

Non-slip and adhesive effects

The following three types of napped polyolefin cloths were made for use as substrates to be tested. The napping was carried out by using a drum sander consisting of a roll on whose surface had been uniformly adhered finely divided silicon carbide.

K-1: The protuberant portions of the woven surface of a cloth woven with stretched polyethylene tape (2000 denier, 14 x 14 mesh) were raised with 0.02 mm. naps.
K-2: The surface of a similar polyethylene cloth as that of K-1 was raised with 0.015-0.025 mm. naps.
K-3: A cloth woven with stretched polyethylene tape (1200 denier, 15 x 15 mesh) was raised with 0.018 mm. naps.

These napped polyolefin cloths were each applied the hereinbefore described coating compositions, using a gravure roll coater, following which the non-slip and adhesive effects were measured. The results obtained are presented in Table II.

TABLE II

| Recipe | Amount applied (solids content, g./m.²) | Substrate | Coefficient of friction [1] | Abrasion resistance [2] (time) |
|---|---|---|---|---|
| (4) | 8 | K-1 | 0.68 | 340 |
| (5) | 6 | K-2 | 0.68 | 410 |
| (6) | 8 | K-3 | 0.70 | 390 |

[1,2] The methods of testing used were those described in Example 1.

EXAMPLE 3

Preparation of compositions

Mixing rolls were used and coating compositions (7), (8), (9), (10) and (11) of the present invention and comparison compositions (C) and (D) were prepared in accordance with the recipes given in Table II.

TABLE III

| | Ingredient | Invention recipe | | | | | Comparison recipe | |
|---|---|---|---|---|---|---|---|---|
| | | (7) | (8) | (9) | (10) | (11) | (C) | (D) |
| (a) | Calcium carbonate | 70 | 70 | | | 100 | 100 | 100 |
| | Barium sulfate | | 30 | | | | | |
| | Zinc oxide | | | | 70 | | | |
| | Clay | 30 | | 50 | | | | |
| | Magnesium sulfate | | | 50 | 30 | | | |
| (b) | Coumarone-indene resin | 10 | | 10 | | 10 | | |
| | Styrene-butadiene copolymer | | | 10 | | | | 40 |
| | Limed resin | 10 | 25 | | 10 | 10 | | |
| | Cyclized rubber | 20 | 25 | 30 | 25 | 20 | | |
| | Butyl rubber | 30 | 25 | 10 | 25 | 30 | | 20 |
| (c) | Polyethylene (molecular weight 1,500) | 70 | 65 | 80 | 70 | 70 | | 40 |
| (d) | Vinyl acetate-vinyl chloride copolymer | 40 | 40 | 40 | | 20 | | |
| | Polychloroprene | | | | 20 | | | |
| | Chlorinated polyethylene | | | | | 20 | | |
| | Chlorinated rubber | | | | | 20 | 100 | |
| (e) | Toluene | 200 | 150 | 250 | 100 | 200 | 250 | 300 |
| | Ethyl acetate | 50 | 100 | | 50 | 50 | | |
| | Methyl ethyl ketone | | | | 100 | | 50 | |

Non-slip and adhesive effects

A drum sander was used and 0.02 mm. naps were raised on the protuberant portions of the woven surface of a cloth woven with polyethylene tape (2000 denier, 14 x 14 mesh). This was used as the substrate for test use.

Each of the foregoing compositions was applied to the surface of this substrate using a gravure roll coater in such an amount that the solids applied would become 5 grams per square meter. The non-slip and adhesive effects obtained are shown in Table IV. The methods used for measuring the coefficient of friction and the abrasion resistance were those described in Example 1.

TABLE IV

| Recipe | Coefficient of friction | Abrasion resistance (time) |
|---|---|---|
| Invention recipe: | | |
| (7) | 0.61 | 463 |
| (8) | 0.59 | 463 |
| (9) | 0.62 | 397 |
| (10) | 0.62 | 408 |
| (11) | 0.63 | 455 |
| Comparison recipe: | | |
| (C) | 0.43 | 52 |
| (D) | 0.52 | 84 |

We claim:

1. A coating composition for arresting the surface lubricity of polyolefin shaped articles, said composition comprising a homogeneous mixture containing
    (a) at least one water-insoluble finely divided inorganic substance selected from kaolin, clay, bentonite, satin white, titanium white, zinc oxide, magnesium oxide, magnesium sulfate, barium sulfate, calcium carbonate and iron oxides,
    (b) at least one elastomeric polymer containing no chlorine in the molecule, said polymer being selected from the group consisting of a styrene-butadiene copolymer, ethylene-vinylacetate copolymer, isoprene-isobutylene copolymer, polyisobutylene, atactic polypropylene and cyclized rubber,
    (c) polyethylene of a molecular weight of 1,000–10,000,
    (d) at least one chlorine-containing polymer selected from the group consisting of polychloroprene, chlorinated rubber, vinyl chloride-vinylacetate copolymer, chlorinated polyethylene and chlorinated polypropylene, and
    (e) at least one organic solvent capable of dissolving ingredients (b), (c) and (d); wherein the weight ratio of ingredient (b) to ingredient (a) is within the range of 1:5 to 1.7:1, the weight ratio of ingredient (c) to ingredient (a) is 1:16 to 1.2:1, the amount of ingredient (d) is 20–150% by weight based on the amount of ingredients (b)+(c), and the amount of ingredient (e) is an amount sufficient to dissolve ingredients (b), (c) and (d).

2. The composition of claim 1 wherein ingredient (a) is calcium carbonate.

3. The composition of claim 1 wherein ingredient (a) is clay.

4. The composition of claim 1 wherein ingredient (b) is butyl rubber.

5. The composition of claim 1 wherein ingredient (b) is cyclized rubber.

6. The composition of claim 1 wherein ingredient (b) is polyisobutylene.

7. The composition of claim 1 wherein ingredient (b) is a styrene-butadiene copolymer.

8. The composition of claim 1 wherein
    ingredient (a) is calcium carbonate and magnesium sulfate,
    ingredient (b) is polyisobutylene,
    ingredient (c) is a polyethylene of a molecular weight of 1,500–5,000,
    ingredient (d) is polychloroprene and chlorinated polypropylene, and
    ingredient (e) is toluene.

9. The composition of claim 1 wherein
    ingredient (a) is calcium carbonate,
    ingredient (b) is an ethylene-vinyl acetate copolymer,
    ingredient (c) is a polyethylene of molecular weight of 1,500–5,000,
    ingredient (d) is chlorinated polyethylene, and
    ingredient (e) is toluene.

10. The composition of claim 1 wherein
    ingredient (a) is calcium carbonate,
    ingredient (b) is cyclized rubber,
    ingredient (c) is a polyethylene of a molecular weight of 1,500–5,000,
    ingredient (d) is polychloroprene, and
    ingredient (e) is toluene.

References Cited

UNITED STATES PATENTS

| | | | |
|---|---|---|---|
| 3,246,831 | 4/1966 | Teicher | 117—138.8 E |
| 2,226,541 | 12/1940 | Browne | 260—5 |
| 3,344,099 | 9/1967 | Cahill et al. | 260—33.6 A |
| 2,593,681 | 4/1952 | Leydon | 260—33.6 A |
| 2,084,500 | 6/1937 | Otto et al. | 260—33.6 A |
| 3,093,601 | 6/1963 | Gessler et al. | 260—28.5 |
| 2,909,443 | 10/1959 | Wolinski | 117—16 |
| 3,330,684 | 7/1967 | Wheeler | 260—28.5 R |
| 3,446,646 | 5/1969 | Terry | 260—28.5 R |

OTHER REFERENCES

Modern Plastics Encyclopedia, 1967, p. 241.
H. J. Wolfe: "Printing and Litho Inks," p. 224, 1957.
Skeist: "Handbook of Adhesives," 1964, pp. 221–223.

THEODORE MORRIS, Primary Examiner

U.S. Cl. X.R.

117—138.8 E; 260—4 R, 28.5 D, 33.6 A, 33.6 AQ, 41 A, 41 B, 41 R, 889, 897